United States Patent
Altammar et al.

(10) Patent No.: US 12,516,238 B2
(45) Date of Patent: Jan. 6, 2026

(54) ENHANCED TREATMENT OF KEROGEN WITH FORMATE-BASED SLICKWATER FLUIDS

(71) Applicant: SAUDI ARABIAN OIL COMPANY, Dhahran (SA)

(72) Inventors: Murtadha J. Altammar, Dhahran (SA); Khalid Mohammed Alruwaili, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/587,507

(22) Filed: Feb. 26, 2024

(65) Prior Publication Data
US 2025/0270441 A1    Aug. 28, 2025

(51) Int. Cl.
C09K 8/74    (2006.01)

(52) U.S. Cl.
CPC ............ *C09K 8/74* (2013.01); *C09K 2208/12* (2013.01)

(58) Field of Classification Search
CPC ..................................................... E21B 43/267
See application file for complete search history.

(56) References Cited

U.S. PATENT DOCUMENTS

| | | | |
|---|---|---|---|
| 3,434,544 A * | 3/1969 | Satter | E21B 43/24 166/303 |
| 8,104,536 B2 | 1/2012 | Looney et al. | |
| 9,033,033 B2 | 5/2015 | Thomas et al. | |
| 9,133,398 B2 | 9/2015 | Wigand et al. | |
| 9,447,314 B2 * | 9/2016 | Reyes | C09K 8/035 |
| 10,889,753 B2 | 1/2021 | Eluru et al. | |
| 11,486,241 B2 | 11/2022 | Nelson et al. | |
| 11,661,545 B2 | 5/2023 | Zakaria | |
| 2012/0175116 A1 * | 7/2012 | Wigand | C10G 9/00 166/279 |
| 2017/0066959 A1 | 3/2017 | Hull et al. | |
| 2019/0233714 A1 | 8/2019 | Hull et al. | |
| 2021/0032527 A1 | 2/2021 | Todd | |
| 2021/0095188 A1 | 4/2021 | Eluru et al. | |

FOREIGN PATENT DOCUMENTS

| | | |
|---|---|---|
| CN | 113969159 A | 1/2022 |
| EP | 3101086 A1 | 12/2016 |
| WO | 2021138119 A1 | 7/2021 |

OTHER PUBLICATIONS

Hull, Katherine L., David Jacobi, and Younane N. Abousleiman. "Oxidative kerogen degradation: a potential approach to hydraulic fracturing in unconventionals." Energy & Fuels 33.6 (2019): 4758-4766.

Hull, K.L. and Abousleiman, Y.N., 2022. Chemomechanical effects of oxidizer—CO2 systems upon hydraulically fractured unconventional source rock. The Canadian Journal of Chemical Engineering, 100(6), pp. 1417-1426.

Oyenowo, O.P., Sheng, K. and Okuno, R., 2023. Simulation case studies of aqueous formate solution for geological carbon storage. Fuel, 334, p. 126-643.

Davarpanah, A. and Mirshekari, B., 2019. Effec of formate fluids on the shale stabilization of shale layers. Energy Report, 5, pp. 987-992.

Liao, Z., Chen, F., Deng, Y., Wang, K., Von Gunten, K., He, Y. and Zhong, C., 2022. Organic weighting hydraulic fracturing fluid: complex interactions between formate salts, hydroxy carboxylate acid, and guar. SPE Journal, 27(04), pp. 2334-2351.

Written Opinion and International Search Report from corresponding PCT Application No. PCT/US2025/015629 mailed May 8, 2025.

* cited by examiner

*Primary Examiner* — William D Hutton, Jr.
*Assistant Examiner* — Avi T Skaist
(74) *Attorney, Agent, or Firm* — Vorys, Sater, Seymour and Pease LLP

(57) ABSTRACT

Methods for treating a kerogen-containing subterranean formation including providing a slickwater fluid comprising formate, present in a molality ranging from about 1.5 to about 15.0; and at least one oxidant; and, introducing the slickwater fluid into a subterranean formation comprising kerogen.

17 Claims, No Drawings

ENHANCED TREATMENT OF KEROGEN WITH FORMATE-BASED SLICKWATER FLUIDS

FIELD

The present disclosure generally relates to processes used for treating subterranean formations for enhancing hydrocarbon recovery.

BACKGROUND

Unconventional hydrocarbon reservoirs are reservoirs with trapped hydrocarbons (for example, oil, natural gas, or combinations of them) in which the hydrocarbon mobility is limited. Extraction of hydrocarbons from such reservoirs typically involves increasing the mobility of the hydrocarbons, for example, by hydraulic fracturing. In hydraulic fracturing, a fracturing fluid is flowed through the hydrocarbon reservoir at high pressure. The pressure of the fracturing fluid fractures the reservoir rock to increase the rock's gas conductivity. Some reservoirs include an organic material called kerogen intertwined with the rock matrix. Kerogen which is intertwined within the rock matrix can drastically increase the tensile strength of the rock. As a result, a significant amount of energy can be required to propagate fractures in these reservoirs.

SUMMARY

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, the present disclosure provides a method for treating a kerogen-containing subterranean formation comprising: providing a slickwater fluid comprising formate, present in a molality ranging from about 1.5 to about 15.0; and at least one oxidant; and, introducing the slickwater fluid into a subterranean formation comprising kerogen.

In another aspect, the present disclosure provides a method for treating a kerogen-containing subterranean formation comprising: providing a slickwater fluid comprising at least one oxidant and formate, wherein the formate is present in a molality ranging from about 5.0 to about 8.0; introducing the slickwater fluid into a subterranean formation comprising kerogen.

In yet another aspect, the present disclosure provides a method for treating a kerogen-containing subterranean formation comprising: providing a slickwater fluid comprising formate, present in a molality ranging from about 1.5 to about 15.0; and an oxidant comprising at least one of a peroxide, a persulfate, a chlorate, a bromate, or a permanganate; and, introducing the slickwater fluid into a subterranean formation comprising kerogen.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure generally relates to processes used for treating subterranean formations for enhancing hydrocarbon fluid recovery and, particularly, methods for treating subterranean formations comprising kerogen with a slickwater fluid comprising formate and at least one oxidant.

It has been discovered that breaking and/or disintegrating kerogens (or other organic matter) in fractures in subterranean formations may make the fractures more permeable and thus increase the subterranean formation's gas conductivity. The slickwater fluids of this disclosure can be particularly suited for this purpose.

The slickwater fluids of this disclosure may interact with shale fracture surfaces and adsorb the organic matter and may release methane, carbon dioxide, or both.

When used in hydraulic fracturing operations, the slickwater fluids of this disclosure that include formates and at least one oxidant may create more permeable fracture surfaces than slickwater fluids including oxidants.

The slickwater fluids of this disclosure may have a higher density than other slickwater fluids and thus may require less pump pressure during hydraulic fracturing operations.

Provided herein are methods for treating kerogen-containing subterranean formations comprising providing a slickwater fluid comprising formate, present in a molality ranging from about 1.5 to about 15.0; and at least one oxidant; and introducing the slickwater fluids into subterranean formations comprising kerogen.

The slickwater fluids may include aqueous liquids. Suitable aqueous liquids include water, brine, produced water, flowback water, brackish water, sea water, the like, or combinations thereof.

The slickwater fluids may include formate. The formate in the slickwater fluids may be from the dissociation product of formate salts, formate salt hydrates, formic acid, or formate esters. The term "dissociation product," and grammatical variants as used herein in the context for formates, refers to the fact that when a formate compound is placed in an aqueous liquid, a formation ion is formed. Suitable formate salts include formate salts with alkali metals such has lithium, sodium, and potassium, alkali earth metals such as magnesium and calcium, ammonium, or the like.

The formate present in the solution may range from about f1 m (molality) to about f2 m, where f1 and f2 may be, independently, 1.5, 1.8, 2.0, 2.3, 2.5, 2.8, 3.0, 3.3, 3.5, 3.8, 4.0, 4.3, 4.5, 4.8, 5.0, 5.3, 5.5, 5.8, 6.0, 6.3, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, or 15.5.

The slickwater fluids may include at least one oxidant. Suitable oxidants are oxidants that will disintegrate kerogen or organic matter. Suitable oxidants include hydrogen peroxide, inorganic peroxides, persulfates including alkali metal persulfates such as lithium, sodium, or potassium persulfate, ammonium persulfate, chlorates including as alkali metal chlorates such as lithium, sodium, or potassium chlorates, bromates including alkali metal bromates such as lithium, sodium, or potassium bromate, ammonium bromate, and permanganates including alkali metal permanganates such as lithium, sodium, or potassium permanganate. In particular, the simultaneous use of ammonium persulfate and sodium bromate may be used in the slickwater fluids.

The oxidants present in the solution may range from about x1 m to about x2 m, where x1 and x2 may be, independently, 0.01, 0.05, 0.1, 0.5, 1.0, 1.5, 2.0, 2.5, 3.0, 3.5, 4.0, 4.25, 4.50. 4.75, or 5.0. In particular, x1 and x2 may range from about 0.1 m to about 1.5 m. The oxidants present in the solution may range from about x1 M (molarity) to about x2 M, where x1 and x2 may be, independently, 0.01, 0.05, 0.1, 0.5, 1.0. 1.25, 1.50. 1.75, or 2.0. In particular, x1 and x2 may range from about 0.1 M to about 1 M.

The slickwater fluids of this disclosure may include gelling polymers. Suitable gelling polymers are polymers used to increase the viscosity of slickwater fluids for hydraulic fracturing operations. Suitable gelling polymers include polysaccharides, guar and its derivatives such as hydroxypropyl guar and carboxymethyl hydroxypropyl guar, cellulose and its derivatives, xanthan gum, polyacrylamides, the like, and combinations thereof. The gelling polymer may be present in the slickwater fluids in a range from about 0.1 wt. % to about 2.5 wt. %, based on the total weight of the slickwater fluid.

The slickwater fluids of this disclosure may include crosslinkers. Suitable crosslinkers are crosslinkers that can crosslink gelling polymers. Suitable crosslinkers include borate crosslinkers, metal crosslinkers such as zirconium, calcium, magnesium, iron, chromium and/or aluminum, as well as organometallic compounds, complexes, ions, organic salts, and inorganic salts thereof. The crosslinkers may be present in the slickwater fluids in a range from about 0.05 wt. % to about 1.5 wt. %, based on the total weight of the slickwater fluid.

The slickwater fluids of this disclosure may include breakers. Suitable breakers are breakers that can degrade the gelling polymers to reduce the viscosity of the slickwater fluids. Suitable breakers include bacteria-based breakers, enzyme breakers, and oxidative breakers. The breakers may be encapsulated or not encapsulated. The breakers may be present in the slickwater fluids in a range from about 0.003 wt. % to about 1.3 wt. %, based on the total weight of the slickwater fluid.

The slickwater fluids of this disclosure may include other components known to be used in slickwater fluids such as friction reducers, proppants, surfactants, other viscosifiers, scale inhibitors, or the like. The slickwater fluids may be made by known techniques. The components may be mixed above ground before introduction into a subterranean formation.

The slickwater fluids of this disclosure may be used advantageously for treating kerogen-containing subterranean formations. The methods may include introducing the slickwater fluids into subterranean formations comprising kerogen.

The subterranean formations where the slickwater fluids may be used are not particularly limited except that the formation should comprise kerogen or organic matter. Suitable subterranean formations include shales, cherts, marls, and the like. The kerogens to be treated in the subterranean formations are not particularly limited.

The methods may include wherein the slickwater fluids disintegrate at least some kerogen. The term "disintegration," and grammatical variants thereof as used herein, refers to the reaction of kerogen with the slickwater fluids whereby the kerogen undergoes a decomposition reaction. The disintegration of kerogen may produce gases, and this may further fracture the subterranean formation. The disintegration of kerogen may increase the porosity of the subterranean formation and may increase the subterranean formation's conductivity.

The methods may include performing hydraulic fracturing operations on a subterranean formation. Hydraulic fracturing operations may include perforating a well casing for hydraulic fluid to be injected into the subterranean formation. Hydraulic fracturing operations may include pumping the slickwater fluids into a well at a sufficient pressure to crack the subterranean formation.

The methods may include performing a refracturing operation on a subterranean formation. A refracturing operation may be performed on wells where the productivity of the well has decreased over time. A refracturing operation may include performing a hydraulic fracturing operation on a well that has already been hydraulically fractured.

The methods may include performing a huff-n-puff operation on a subterranean formation. A huff-n-puff operation may include an injection phase (huff), a soak phase, and a production phase (puff). The injection phase may include injecting the slickwater fluids into a well in a subterranean formation. The soak phase may include shutting in the well for a certain amount of time. The time for the soak phase may range from about s1 days to about s2 days, where s1 and s2 may be, independently, 1, 3, 5, 7, 14, 21, 28, 30, 35, 60, 90, 120, 150, 180, 270, 360, 390, 540, or 720. The production phase may include reopening the well and removing fluids including hydrocarbons.

In some embodiments, the slickwater fluids may include at least one gelling polymer and at least one breaker. In these embodiments the slickwater fluids may have a pH level ranging from about 2 to about 5 or about 3 to about 4. Methods for hydraulic fracturing that use these embodiments may, after hydraulic fracturing is performed, allow the formate to decompose and release acid to lower the pH level downhole. This may initiate the degradation of the gelling polymers in the slickwater fluids.

Example Embodiments

The present disclosure is further directed to the following non-limiting embodiments:

Embodiment A: A method for treating a kerogen-containing subterranean formation comprising: providing a slickwater fluid comprising formate, present in a molality ranging from about 1.5 to about 15.0; and at least one oxidant; and,introducing the slickwater fluid into a subterranean formation comprising kerogen.

Embodiments B: A method for treating a kerogen-containing subterranean formation comprising: providing a slickwater fluid comprising at least one oxidant and formate, wherein the formate is present in a molality ranging from about 5.0 to about 8.0; introducing the slickwater fluid into a subterranean formation comprising kerogen.

Embodiment C: A method for treating a kerogen-containing subterranean formation comprising: providing a slickwater fluid comprising formate, present in a molality ranging from about 1.5 to about 15.0; and an oxidant comprising at least one of a peroxide, a persulfate, a chlorate, a bromate, or a permanganate; and, introducing the slickwater fluid into a subterranean formation comprising kerogen.

Each of embodiments A, B, and C may have one or more of the following additional elements in any combination:

Element 1: wherein the formate is present in a molality ranging from about 3.5 to about 15.0.

Element 2: wherein the formate is present in a molality ranging from about 5.0 to about 8.0.

Element 3: wherein the formate is from the dissociation product of sodium formate, potassium formate, or calcium formate.

Element 4: wherein the at least one oxidant comprises a peroxide, a persulfate, a chlorate, a bromate, or a permanganate.

Element 5: wherein the at least one oxidant is present in a molality ranging from about 0.01 to about 5.0.

Element 6: wherein the at least one oxidant is present in a molality ranging from about 0.01 to about 1.5.

Element 7: wherein the at least one oxidant comprises ammonium persulfate and sodium bromate.

Element 8: wherein the slickwater fluid disintegrates at least some kerogen.

Element 9: wherein the slickwater fluid further comprises a gelling polymer and a breaker, wherein the pH of the slickwater fluid ranges from about 3 to about 4, and the method further comprises performing a hydraulic fracturing operation on the subterranean formation comprising pumping the slickwater fluid into a well at a sufficient pressure to crack the subterranean formation.

Element 10: further comprising performing a huff-n-puff operation on the subterranean formation comprising an injection phase, a soak phase, and a production phase.

Element 11: further comprising performing a refracturing operation comprising pumping the slickwater fluid into a well that has already been hydraulically fractured.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A method of treating a kerogen-containing subterranean formation comprising:
    providing a slickwater fluid comprising formate, present in a molality ranging from about 7.0 to about 15.0, and at least one oxidant, wherein the at least one oxidant is present in a molality ranging from about 0.01 to about 5.0;
    introducing the slickwater fluid into a subterranean formation comprising kerogen and wherein the slickwater fluid disintegrates at least some kerogen and adsorbs organic matter to release at least one of methane, carbon dioxide, or both; and
    performing a hydraulic fracturing operation on the subterranean formation comprising pumping the slickwater fluid into a wellbore at a sufficient pressure to fracture the subterranean formation.

2. The method of claim 1, wherein the formate is present in a molality ranging from about 7.0 to about 8.0.

3. The method of claim 1, wherein the formate is from the dissociation product of sodium formate, potassium formate, or calcium formate.

4. The method of claim 2, wherein the formate is the dissociation product of sodium formate, potassium formate, or calcium formate.

5. The method of claim 1, wherein the at least one oxidant comprises a peroxide, a persulfate, a chlorate, a bromate, or a permanganate.

6. The method of claim 1, wherein the at least one oxidant comprises ammonium persulfate and sodium bromate.

7. The method of claim 1, wherein the slickwater fluid further comprises a gelling polymer and a breaker; and
    wherein the pH of the slickwater fluid ranges from about 3 to about 4.

8. The method of claim 1, further comprising performing a huff-n-puff operation on the subterranean formation comprising an injection phase, a soak phase, and a production phase.

9. A method for treating a kerogen-containing subterranean formation comprising:
   providing a slickwater fluid comprising at least one oxidant and formate, wherein the formate is present in a molality ranging from about 7.0 to about 15.0, and wherein the at least one oxidant is present in a molality ranging from about 0.01 to about 5.0;
   introducing the slickwater fluid into a subterranean formation comprising kerogen and wherein the slickwater fluid disintegrates at least some kerogen and adsorbs organic matter to release at least one of methane, carbon dioxide, or both; and
   performing a hydraulic fracturing operation on the subterranean formation comprising pumping the slickwater fluid into a wellbore at a sufficient pressure to crack the subterranean formation.

10. The method of claim 9, wherein the formate is the dissociation product of sodium formate, potassium formate, or calcium formate.

11. The method of claim 10, wherein the at least one oxidant comprises a peroxide, a persulfate, a chlorate, a bromate, or a permanganate.

12. A method for treating a kerogen-containing subterranean formation comprising:
   providing a slickwater fluid comprising:
      formate, present in a molality ranging from about 7.0 to about 15.0; and,
      an oxidant comprising at least one of a peroxide, a persulfate, a chlorate, a bromate, or a permanganate, and wherein the at least one oxidant is present in a molality ranging from about 0.01 to about 5.0;
   introducing the slickwater fluid into a subterranean formation comprising kerogen and wherein the slickwater fluid disintegrates at least some kerogen and adsorbs organic matter to release at least one of methane, carbon dioxide, or both; and
   performing a hydraulic fracturing operation on the subterranean formation comprising pumping the slickwater fluid into a wellbore at a sufficient pressure to crack the subterranean formation.

13. The method of claim 12, further comprising performing a huff-n-puff operation on the subterranean formation comprising an injection phase, a soak phase, and a production phase.

14. The method of claim 12, further comprising performing a refracturing operation comprising pumping the slickwater fluid into a well that has already been hydraulically fractured.

15. The method of claim 1, further comprising performing a huff-n-puff operation on the subterranean formation comprising an injection phase, a soak phase, and a production phase, and wherein the time for the soak phase ranges from about 1 to about 3 days.

16. The method of claim 9, further comprising performing a huff-n-puff operation on the subterranean formation comprising an injection phase, a soak phase, and a production phase, and wherein the time for the soak phase ranges from about 1 to about 3 days.

17. The method of claim 12, further comprising performing a huff-n-puff operation on the subterranean formation comprising an injection phase, a soak phase, and a production phase, and wherein the time for the soak phase ranges from about 1 to about 3 days.

* * * * *